United States Patent [19]

Hooper et al.

[11] Patent Number: 5,472,058
[45] Date of Patent: Dec. 5, 1995

[54] ROCK BIT WITH MECHANICAL SEAL

[75] Inventors: Michael E. Hooper, Spring; Dah-Ben Liang; Madapusi K. Keshavan, both of The Woodlands, all of Tex.

[73] Assignee: Smith International, Inc., Houston, Tex.

[21] Appl. No.: 230,348

[22] Filed: Apr. 20, 1994

[51] Int. Cl.[6] ............................................. E21B 10/22
[52] U.S. Cl. ............................................. 175/371
[58] Field of Search ......................... 175/371, 337, 175/359, 432; 277/81–84, 92–96

[56] References Cited

U.S. PATENT DOCUMENTS

| | | | |
|---|---|---|---|
| 3,449,024 | 6/1969 | Lichte | 308/8.2 |
| 3,529,840 | 9/1970 | Durham et al. | 277/92 |
| 3,572,452 | 3/1971 | Winberg | 175/371 |
| 3,645,591 | 2/1972 | Winberg | 308/187.1 |
| 4,092,054 | 5/1978 | Dye | 308/8.2 |
| 4,623,028 | 11/1986 | Murdoch et al. | 175/371 |
| 4,822,057 | 4/1989 | Chia et al. | 277/84 |
| 4,824,123 | 4/1989 | Chia et al. | 277/84 |
| 4,981,182 | 1/1991 | Dysart | 175/371 X |

*Primary Examiner*—Michael Powell Buiz
*Attorney, Agent, or Firm*—Christie, Parker & Hale

[57] ABSTRACT

A mechanical seal for use in a rotary rock bit comprises a leg seal ring positioned within a recessed portion of a leg forming a seal cavity. The leg seal comprises one surface partially engaged by a resilient material and an opposite surface comprising a first sealing surface. The mechanical seal also comprises cone seal ring positioned within a portion of a cone forming the seal cavity. The cone seal comprises one surface positioned within and attached to a recessed portion of the cone and another surface comprising a second sealing surface engaging the first sealing surface. The portion of the leg seal ring engaged by the resilient material engages a back face of the leg which includes a ramp, serving to urge the first sealing surface against the adjacent second sealing surface and create a sealing engagement. The first and second sealing surfaces are made from different hard materials each having a similar hardness of greater than 1000, and each material selected has a Knoop hardness difference of about 400 or less. The first and second sealing surfaces may be formed from materials the same as or different than materials forming the leg seal ring and cone seal ring, respectively.

24 Claims, 4 Drawing Sheets

ROCK BIT WITH MECHANICAL SEAL

FIELD OF THE INVENTION

This invention relates to a high speed seal for a rotary cone rock bit. More particularly, this invention relates to high speed mechanical seals made of hard materials for a rotary cone rock bit, the sealing surfaces each having a similar hardness and being pre-lapped prior to assembly.

BACKGROUND OF THE INVENTION

There are prior art patents that describe composite seals that are fabricated of resilient material that encapsulates or is adjacent to a metal seal ring. For example, U.S. Pat. Nos. 4,344,629 and 4,394,020 describe and teach mechanical metal-to-metal seals, the metal sealing surfaces of which are not pre-lapped prior to assembly. Both of these patents feature a resilient seal that initially operates to provide a seal while the metal-to-metal dynamic sealing surfaces are being lapped-in during operation of the rotary cone rock bit in a bore hole. U.S. Pat. No. 4,344,629 teaches a non-lapped metal ring that is encapsulated within a resilient material. The resilient material serves to initially provide a seal while the metal surfaces progressively lap themselves in as each rotary cone rotates on its journal while the bit works in a bore hole. U.S. Pat. No. 4,394,020 teaches a metal ring that is bonded to resilient material with a separate O-ring confined within an annular slot formed in the metal ring of the seal. The O-ring, like that in U.S. Pat. No. 4,344,629 serves to provide the initial seal while the dynamic metal sealing surfaces are being lapped-in during bit operation.

U.S. Pat. No. 4,666,001 describes an earth-boring bit with metal-to-metal seals. A rigid face seal assembly is positioned between the cutter and bearing shaft of the rotary bit. The seal assembly moves axially in response to and to compensate for dynamic pressure changes in the lubricant adjacent to the seal. The mechanical metal-to-metal seal is designed to translate axially within an enlarged seal cavity during operation of the bit in a bore hole to react to sudden changes of pressure across the seal face.

The foregoing patent is similar to a typical "Caterpillar" type seal, examples of which are found in U.S. Pat. Nos. 3,180,648, 3,403,916, and 3,524,654 all of which are assigned to the Caterpillar Corporation and which teach improvements to their basic metal-to-metal seal.

These patents, while they illustrate and teach mechanical metal-to-metal seals, do not elaborate on the materials used to form the mechanical sealing surfaces. U.S. Pat. No. 4,824,123 describes and teaches a metal-to-metal seal comprising a static metal seal ring and a dynamic metal seal ring, the sealing surface of the static seal ring comprising a relatively softer metallic material than an opposite dynamic sealing surface. The use of opposing metallic sealing surfaces each having a different metallic hardness was believed to be beneficial as the relatively softer sealing material would be expected to wear at a faster rate to accommodate for cone wobble or eccentricities that may occur between the cone and the journal during operation of the rotary cone rock bit in a bore hole. Accordingly, the relatively softer sealing surface was in effect sacrificial in nature.

It has been discovered that the use of a mechanical seal comprising the pairing of a seal ring made from a soft material with a seal ring made from a hard material, although serving to accommodate cone wobble or eccentricities that may occur during use, also undergoes accelerated wear during such use that ultimately reduces the service life of the rock bit. As the sacrificial mechanical seal member begins to wear, the spatial tolerance between the rotating cone and the rock bit journal increases. With continued mechanical seal wear, the tolerance increases to a point where either the lubricant kept within the cone to lubricate the cone bearings is allowed to escape past the seal, or abrasive drilling mud directed near the rock bit is allowed to enter into the cone past the seal. The occurrence of either event generally has the effect of decreasing the service life of the rock bit.

It is, therefore, desirable that a rotary cone rock bit comprise a mechanical seal having sealing materials constructed in a manner that reduces the potential of premature wear or failure of the sealing surfaces during service at the high temperatures, bearing pressures and rotational speeds often found in modern rock bits, thus enhancing the service life of such rock bits. It is also desirable that the mechanical seal promote optimum sealing during the use of the rock bit and that the mechanical seal have sealing members made from materials that are both relatively available and economic to construct using practical manufacturing methods.

SUMMARY OF THE INVENTION

There is, therefore, provided in the practice of this invention a mechanical seal for a rotary cone rock bit comprising a leg seal ring positioned within a recessed portion of the leg forming a seal cavity. The leg seal ring is configured in the shape of a circular ring having one surface at least partially engaged by a resilient material and an opposite surface comprising a first sealing surface made from a first sealing material. The first sealing material is selected from the group of hard materials including hardened metals, ceramics, ceramic-metal composites and the like. The first sealing material can be the same or different than the material forming the leg seal ring.

The portion of the leg seal ring engaged by the resilient material engages a back face of the leg forming a ramp, serving to urge the first sealing surface of the leg seal ring against an adjacent second sealing surface of a cone seal ring. The cone seal ring is positioned within a portion of the cone forming a seal cavity. The cone seal ring comprises a circular ring having one surface attached within a recessed portion of the cone and an opposite surface comprising the second sealing surface made from a second sealing material. The second sealing material is selected from the group of hard materials including hardened metals, ceramics, ceramic-metal composites and the like. The second sealing material can be the same or different than the material forming the cone seal ring.

The first and second sealing surfaces are made from first and second sealing materials, respectively, that are different from each other. Mechanical seals constructed according to principles of this invention have been shown to enhance the service life of a rock bit incorporating the same over rock bits having mechanical seals comprising first and second sealing surfaces made from materials having significantly different hardness values. Constructing sealing surfaces made from different materials has been shown to reduce friction at the interface and, thus eliminate the excessive wear typically encountered when using one hard and one soft sealing surface. Eliminating excessive wear at the sealing surface maximizes the life time during which the sealing surfaces are able to maintain a sealing engagement and, thus minimizes the possibility of early cone bearing failure due to either the lubricant leaking out of the cone or abrasive drilling mud passing into the cone.

DETAILED DESCRIPTION

Figure 1:
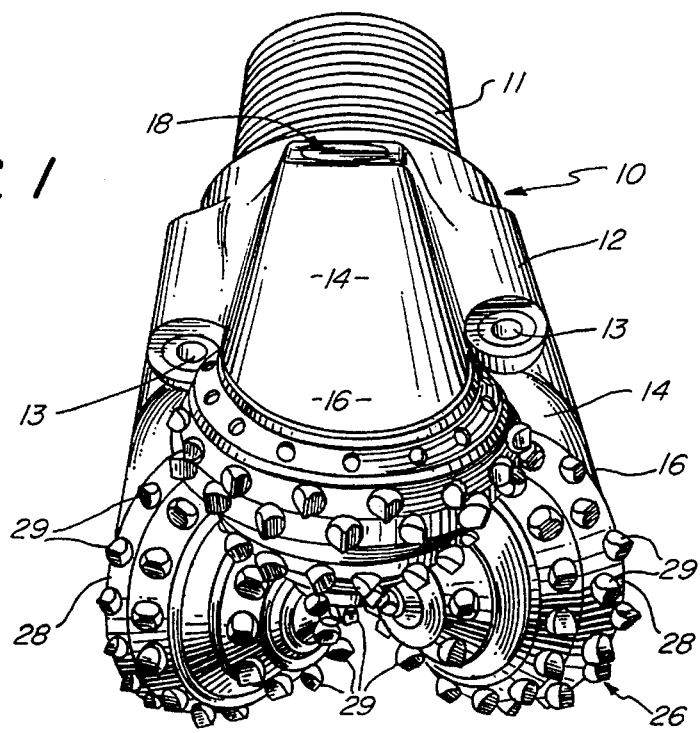
FIG. 1 is a perspective view of a typical rotary cone rock bit.

With reference now to FIG. 1, the sealed bearing rotary cone rock bit, generally designated as 10, comprises a rock bit body 12, pin end 11 and cutting end generally designated as 26. Each cone 28 making up the cutting end 26 is attached to a leg 14 that terminates in a shirttail portion 16. Each of the cones 28 has, for example, a multiplicity of equally spaced tungsten carbide cutter inserts 29, interference fitted within insert holes formed in the cone bodies 28. A lubricant reservoir generally designated as 18 is provided in each of the legs 14 to supply lubricant to bearing surfaces formed between the rotary cones and their respective journals. Three or more nozzles 13 communicate with a chamber formed inside the bit body 12 (not shown). The chamber receives drilling fluid or "mud" through the pin end 11. The fluid then is directed out through the nozzles 13 during bit operation.

Figure 2:
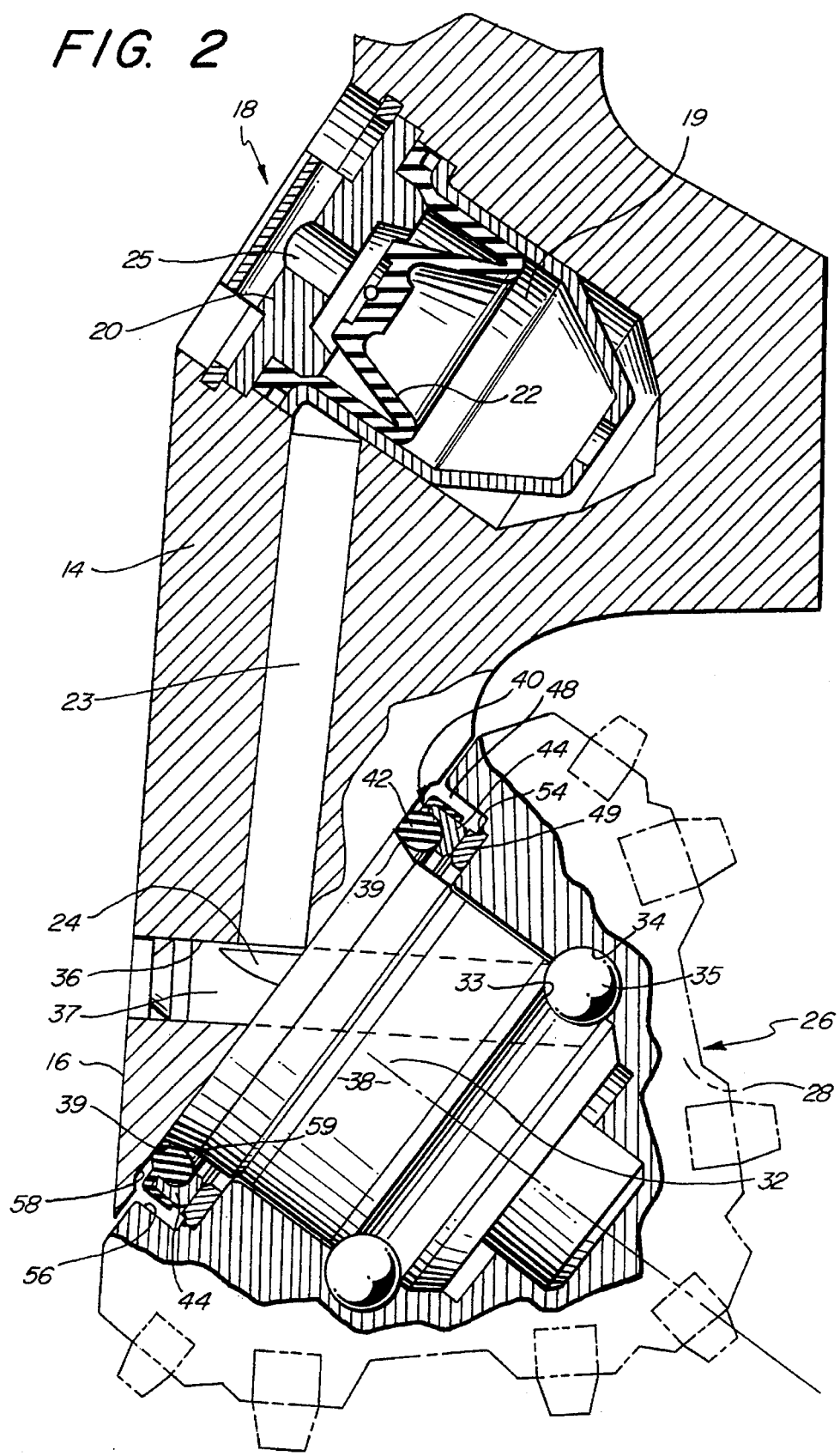
FIG. 2 is a cross-sectional view of a leg of a rotary cone rock bit illustrating a portion of the cone mounted onto a journal bearing.

Turning now to FIG. 2 the rock bit leg 14 is shown in cross-section revealing the lubricant reservoir system generally designated as 18. The reservoir system comprises a reservoir cover cap 20 which closes out a lubricant reservoir cavity 19. The reservoir 19 is isolated from the cover cap by a resilient diaphragm 22; the diaphragm being responsive to exterior pressures through a 25 formed in the cover cap 20. Lubricant is passed down a lubricant channel 23 formed in the leg towards a ball hole 36 formed through the shirttail portion 16. Lubricant then enters into a lube channel 24 formed in a ball hole plug 37. Lubricant passes to the bearing surfaces formed between the journal 32 and the cone 28 via ball races 33 and 34.

A series of cone retention balls 35 are passed through the ball hole 36 into the bearing race 33 and 34 formed in the journal and the cone respectively. After all the cone retention balls are in place, the ball hole plug 37 is typically inserted and welded in place to retain the balls within the race.

Figure 3:
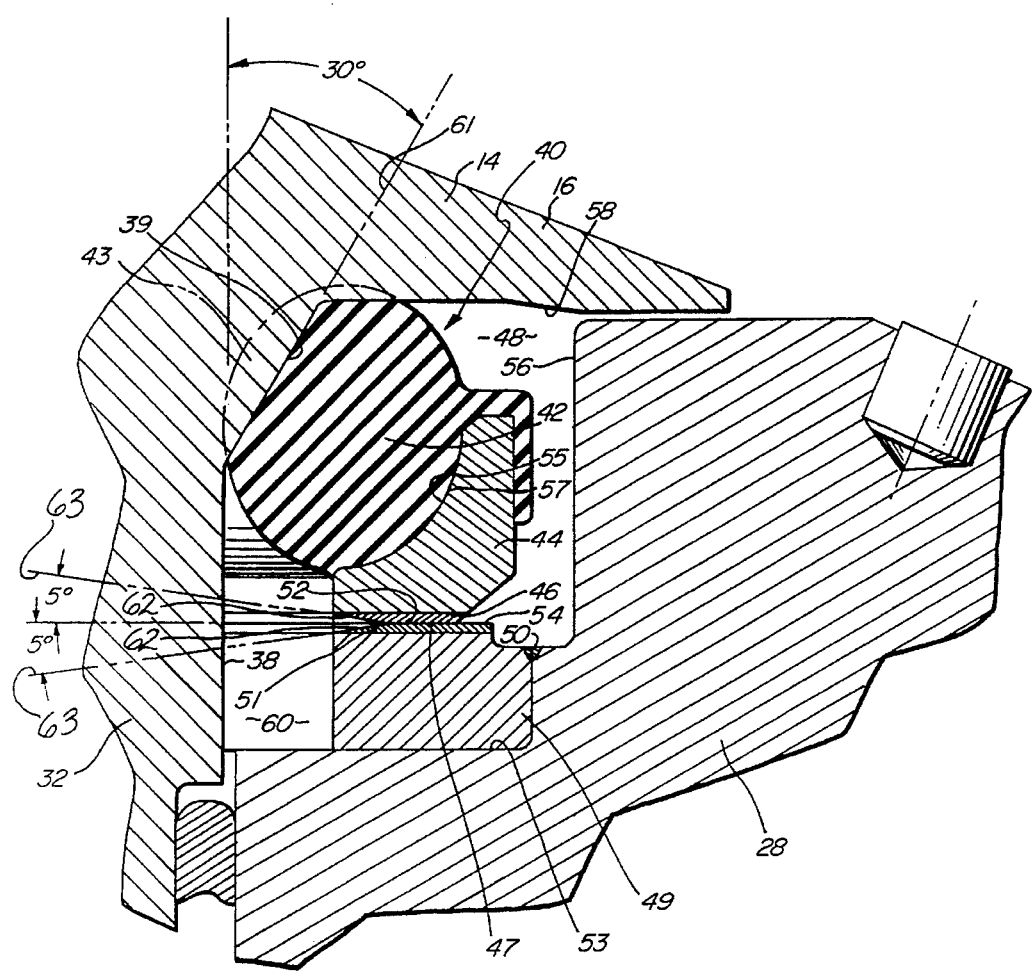
FIG 3 is an enlarged cross-sectional view of a preferred mechanical seal housed within a seal cavity shown in FIG. 2, formed between the journal bearing and the rotary cone.

With reference now to preferred embodiments of a mechanical seal constructed according to principles of this invention depicted in FIGS. 2 and 3, a mechanical seal, generally designated as 40, comprises a leg seal ring 44 having a diameter adapted to fit inside a recessed portion of the leg forming the seal cavity, and a cone seal ring 49 having a diameter adapted to fit inside a recessed portion of the cone forming the seal cavity. With respect to the leg seal ring 44, a resilient material 42 at least partially engages one surface 55 of the leg seal ring 44 directed adjacent to the rock bit leg 14. The rubber-like resilient material 42 is designed to be larger in size than a portion of a seal cavity formed by a leg back face 58, a cone wall 56, a radial surface 54 on the cone seal ring, a ramp 39 and a bearing surface 38 of the journal 32. The leg seal ring comprises a first sealing surface 47 at an end opposite to the resilient material. The first sealing surface is made from a first sealing material 46 that may either be the same as or different than the material forming the leg seal ring.

One surface of the cone seal ring 49 is positioned adjacent to a recessed portion 53 of the cone. A second sealing surface 52 is positioned adjacent to the first sealing surface 47. The second sealing surface is made from a second sealing material 51 that may either be the same as or different than the material forming the cone seal ring. A portion 43 of the resilient material is compressed by the ramp 39 and leg back face 58 to urge the first sealing surface 47 against the second sealing surface 52 to perfect a substantially sealing engagement. The resilient material 42, may, for example, be made from nitrile rubber. It is desired that the resilient material comprise nitrile rubber having a Shore A hardness in the range of from 50 and 70. A preferred nitrile rubber has a Shore A hardness of approximately 60.

If it is desired that the first and second sealing surfaces 47 and 52 be formed from first and second sealing materials 46 and 51 different from that used to make the leg and cone seal rings 44 and 47, the first and second sealing materials may be metallurgically bonded to the respective leg and Cone seal ring 44 and 47, or may be deposited by using deposition techniques such as plasma spray and D-gun and the like. Alternatively, the material may be welded or brazed in place without departing from the scope of this invention. Otherwise, the first and second sealing surfaces may each be formed from the same material used to make the leg and cone seal rings.

The cone seal ring 49 is preferably metallurgically bonded to the cone along an annular intersection 50 extending circumferentially around a recessed portion 53 within the cone 28. The cone seal ring may be laser welded and hermetically sealed at intersection 50 by a process disclosed in U.S. Pat. No. 4,560,175 and hereby incorporated by reference.

It is preferred that the second sealing surface 52 have a lapped surface area that is larger than the lapped surface area of the first sealing surface 47. The cone seal ring is configured having a larger second sealing surface to accommodate for cone wobble or eccentricities that may occur during operation of the rock bit 10 in a bore hole (not shown), thereby maintaining a sealing engagement between the first and second sealing surfaces.

It is preferred that the first sealing material 46 forming the first sealing surface comprises a hard material selected from the group including hardened metals, ceramics, ceramic-metal composites and the like. It is desired that the first seal material selected have a Knoop hardness greater than about 1000. Exemplary first sealing materials and their respective hardness on a Knoop scale include: cemented tungsten carbide with 15 percent cobalt (WC-15Co; Knoop hardness= 1150) manufactured by Union Carbide under the product name SDG 2000; cemented tungsten carbide with 11 percent cobalt (WC-11Co; Knoop hardness=1370); cemented tungsten carbide with 6 percent cobalt (WC-6Co; Knoop hardness=1700) manufactured by Carbidie of Irwin, Pa. under the product name CD-337; tungsten with 20 percent chromium/7 percent nickel/6 percent carbide (W-20Cr-7Ni-6C; Knoop hardness=1000) manufactured by Union Carbide under the product name SDG 2005; boronized steel (Knoop hardness=greater than 1000); sintered silicon carbide (SIC; Knoop hardness= 2800); aluminum oxide ($Al_2O_3$; Knoop hardness=2000); silicon nitride ($Si_3N_4$; Knoop hardness=

2200); and diamond (Knoop hardness=greater than 4000). It is to be understood that although the cemented tungsten carbide materials disclosed above comprise a cobalt binder, cemented tungsten carbide materials comprising a nickel binder can also be used as a sealing material without departing from the scope of this invention.

It is preferred that the second sealing material 51 forming the second sealing surface be selected from the group of hard materials including hardened metals, ceramics, ceramic-metal composites and the like. Like the first sealing material, it is also desired that the second sealing material have a Knoop hardness of greater than about 1000. Exemplary second sealing materials include the same materials as previously described above for the first sealing materials.

Mechanical seals have traditionally been constructed using metal-to-metal seals each made from metallic materials having a significantly different hardness. For example, it is well known to construct a mechanical seal comprising a cone seal ring having a sealing surface made from a material that is much harder than a complementary sealing surface of a leg seal ring. Sealing surfaces have been constructed in this manner because it was believed that the soft or "sacrificial" material would wear away as needed to accommodate for cone wobble or eccentricities that would eventually develop between the cone and the journal during operation of the rotary cone rock bit in a bore hole.

However, it has been discovered that constructing the first and second sealing surfaces each from materials having a significantly different hardness promotes excessive wear of the softer material and, thus reduces the service life of the rotary cone rock bit through eventual seal failure. As the softer sealing material begins to wear away the tolerance between the leg and the cone increases. As the softer sealing material continues to wear away the spatial tolerance between the journal and the cone increases to a point where the first and second sealing surfaces are no longer able to maintain sealing engagement between themselves. Once the sealing engagement has been compromised, cone bearing failure is eventual through either leakage of the cone bearing lubricant from the lubricant reservoir, or passage of abrasive drilling mud into the seal cavity.

Accordingly, it is desirable that the hard material selected for the first sealing material have a hardness approximately the same as the hard material selected for the second sealing material. For sealing material pairs made from sealing materials that have a Knoop hardness of approximately 2000 or less, it is preferred that the first and second sealing material, have a Knoop hardness difference of less than about 400. For sealing material pairs made from sealing materials that have a Knoop hardness in the range from 1000 to 4000, the first and second sealing material may have a Knoop hardness difference of less than about 2000. It has been discovered that constructing a mechanical seal according to such principles avoids the type of excessive wear previously encountered with sealing surfaces made from materials having a significantly different hardness, thus enhancing the service life of the rock bit. It is also desirable that the first and second sealing surface each be formed from a different sealing material to prevent high friction, galling and bonding that may occur on the first and second sealing surfaces due to high contact stresses that are known to develop between identical materials having an equal hardness.

Exemplary first and second sealing material pairs 46 and 51 are selected from the exemplary materials previously described above and include all of the possible different combinations that can be obtained by combining one material with another in such a manner that the first sealing material be the relatively softer of the material pair. It is preferred that the first sealing material be the relatively softer of the two materials in order to accommodate to some extent any cone wobble that may occur during the use of the rock bit.

Particularly preferred first and second sealing material pairs 46 and 51 include but are not limited to: WC-15Co and WC-11Co; WC-11Co and WC-6Co; W-20Cr-7Ni-6C and WC-15Co; W-20Cr-7Ni-6C and WC-11Co ; boronized steel and W-20Cr-7Ni-6C; boronized steel and WC-15Co; boronized steel and WC-11Co ; boronized steel and SiC; WC-6Co and $Al_2O_3$; $Al_2O_3$ and $Si_3N_4$; $Al_2O_3$ and SiC, and $Si_3N_4$ against SiC. It is desired that the first and second material pairs each comprise different materials for a majority of the exemplary first and second sealing materials described above to preventing galling the first and second surfaces. However, the same is not true for the exemplary first and second sealing materials described above that have a Knoop hardness of greater than about 2000. It has been discovered that pairing first and second sealing surfaces made from identical first and second sealing materials having a Knoop hardness greater than about 2000 does not result in the two surfaces galling or bonding together. Accordingly, particularly preferred first and second sealing material pairs also include; SiC against SiC, and diamond against diamond.

The first and second sealing surfaces are pre-lapped together and highly polished prior to inserting the rings within the seal cavity 48. The first and second sealing surfaces 47 and 52 should preferably be lapped flat within two helium light bands and highly polished to a surface finish of from two to four microinches Ra. It would be very difficult to lap a sealing surface within the cavity or recess 53 formed in the cone 28. Hence, seal rings 44 and 49 are carefully paired and their sealing surfaces 47 and 52 are completely finished prior to metallurgically securing the cone seal ring 49 within the cone mouth or recess 53.

The seal cavity 48 clearly shown in FIG. 3 is divided into two areas 48 and 60 separated by the seal 40. It is preferred that the internal area 60 be somewhat larger in size than area 48 outside the seal. The annulus 60 is formed between the inner diameter of seal rings 49 and 44 and the inside surface of the resilient material 42 and contains internal lubricant from the lube reservoir system 18. The area 48 that is exterior to the seal assembly 40 is exposed to the outside environment which includes mud and detritus generated when the bit 10 works in a bore hole.

Such a seal 40 is favored when higher grease pressures occur within the internal annulus 60 while lubricating the bearing surfaces. Higher internal grease pressures serve to protect the lapped first and second sealing surfaces since any breach of the seal between the two lapped surfaces would cause the lubricant under higher pressures to escape outwardly from the cavity 60. Therefore, higher interval lube pressures prevent any detritus that may be in outer seal cavity 48 from ruining the lapped sealing surfaces.

The resilient nitrile material 42 may be bonded to the leg seal ring 44 at ring surface 55 and at nitrile surface 57 through well-known vulcanization processes. It would also be desirable to roughen the surface 55 to about a 120 microinches Ra for better bonding of the nitrile material to the leg seal ring.

The ramp angle 61 of ramp 39 with respect to a centerline of the journal bearing is preferably in the range of from 10 and 45 degrees. A particularly preferred ramp angle is about 30 degrees as shown in FIG. 3. The angle of ramp helps to secure the enlarged resilient material 42 and prevent it from rotating against the leg during operation of the rock bit, i.e., the rotation of the cone.

The nitrile rubber 42 may additionally be bonded to the surface ramp 39 if desired. In such an embodiment, the ramp surface is preferably roughened to about 120 microinches Ra prior to adhering an adjacent surface of the resilient material to the ramp. An adhesive may be used to adhere the surfaces together such as Loc-Tite super bond thermal cycle gel designated as 499 by the manufacturer, Loc-Tite Corporation of Connecticut.

The first and second sealing surfaces 47 and 52 each comprise a ramped portion 62 having a shallow radially disposed angle 63 of about five degrees. The ramped portion serves two primary purposes. First, the ramped portion serves to introduce and feed grease from the grease reservoir 18 to the first and second sealing surface 47 and 52. The second purpose is to provide an easy transition and a good sealing surface as the opposing sealing surfaces wear during use, thereby helping to prevent grooving of the opposing surfaces during operation of the bit in bore hole.

Although a specific embodiment of the rock bit with a mechanical seal has been described and illustrated herein, many modifications will be apparent to those skilled in the art. For example, a mechanical seal configuration constructed according to principles of this invention may alternatively comprise a separate O-ring that nests within the leg seal ring, substituting for the resilient material 42 bonded to and engaging a portion of the leg seal ring. Like the resilient material in a preferred embodiment, the O-ring is positioned adjacent to the ramp portion of the leg back face to urge the leg seal towards the cone seal ring.

Figure 4:
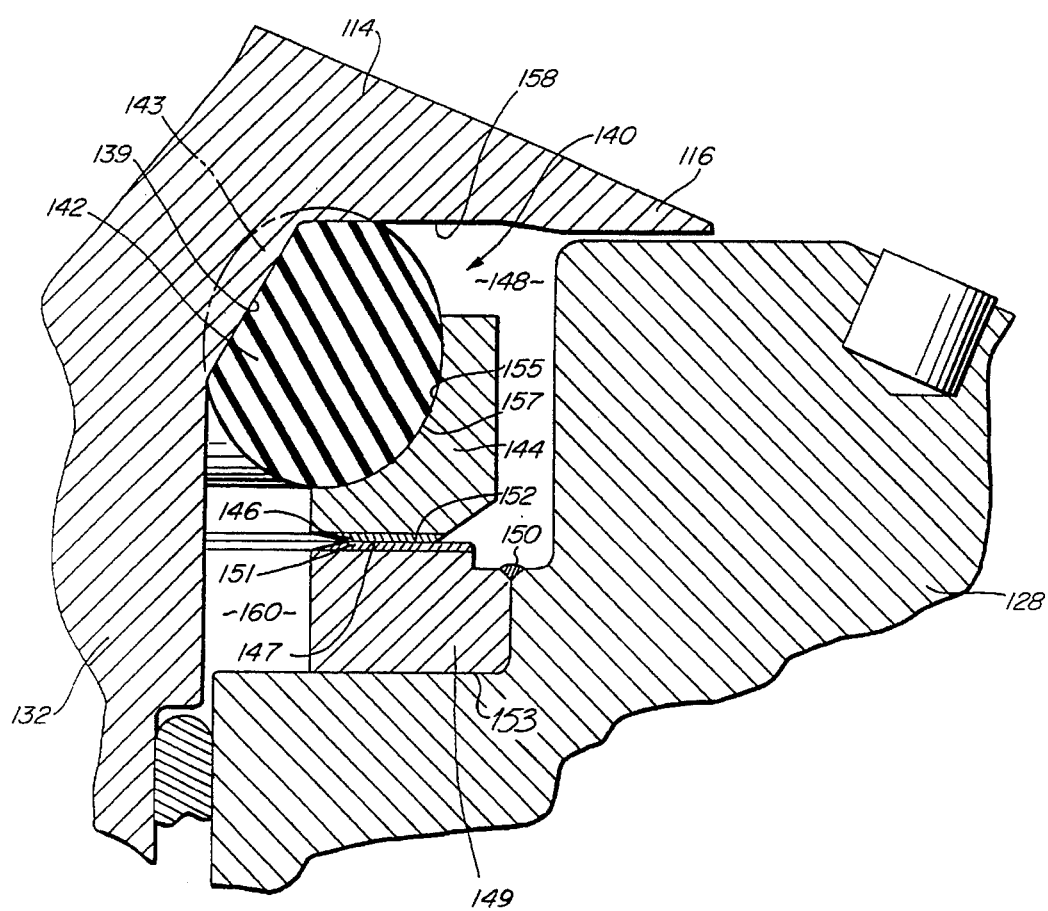
FIG. 4 is an enlarged cross-sectional view of an alternative embodiment of a mechanical seal enclosed within the seal cavity formed between the journal bearing and the cone of the rock bit.

FIG. 4 illustrates an alternative embodiment wherein a mechanical seal assembly generally designated as 140 comprises a separate O-ring 142 nested within a concave surface 155 formed in a leg seal ring 144. The O-ring 142 is biased against the concave surface 155 by ramp 139 formed in a leg back face 158. Polished and pre-lapped first and second sealing surfaces 147 and 152 formed from first and second sealing materials 146 and 151 are selected from the same materials previously described for the first and second sealing materials 46 and 51 and illustrated in FIGS. 2 and 3. Like a preferred embodiment, the first and second sealing surfaces 147 and 152 can each be the same or different than that forming the leg and cone seal rings 144 and 149, respectively.

First and second sealing surfaces 147 and 152 are urged together by the interaction between the oversized O-ring 142 (phantom 143) against the ramp 139 to assure that the first and second sealing surfaces remain in sealing engagement during operation of the rock bit in a bore hole. The mechanical seal 140 operates exactly the same as a preferred embodiment previously described and illustrated in FIGS. 2 and 3, with the exception that the O-ring 142 in not bonded or secured to the leg seal ring 144. If desired, the concave surface 155 of the leg seal ring 144 may be slightly roughened to assure that the surface 157 of O-ring 142 does not slip against and permit movement of the leg seal ring during operation of the bit.

A cone seal ring 149 is secured within a recessed portion 153 of the cone 128 through a preferred metallurgical bond 150 at the juncture between the outer peripheral diameter of the ring 149 and the recessed portion 153. The ring 149 may be welded to the cone by a laser welding machine and the like.

Figure 5:
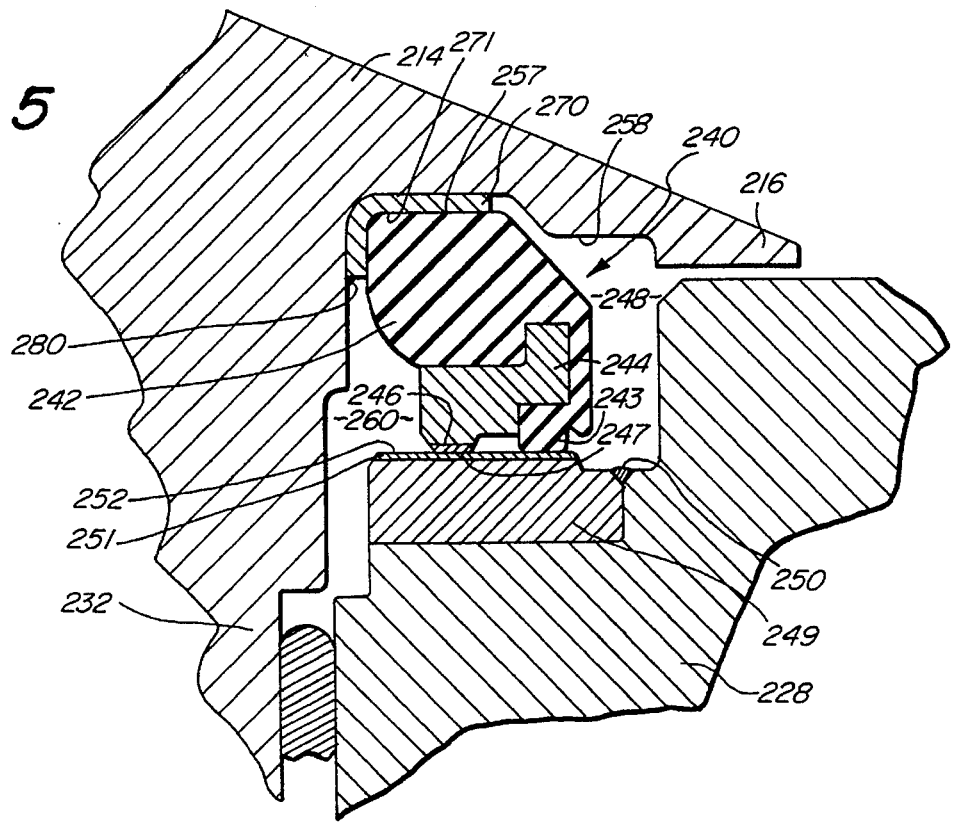
FIG. 5 is an enlarged cross-sectional view of yet another embodiment of a mechanical seal.

Another embodiment of a mechanical seal constructed according to principles of this invention is illustrated in FIG. 5. A mechanical seal generally designated as 240 comprises a leg seal ring 244 that is at least partially engaged by a resilient material 242 such as nitrile rubber and the like. The resilient material almost completely surrounds one surface of the leg seal ring positioned adjacent to a cone seal ring 249 to form a rubber seal band 243 that interfaces with a portion of a second sealing surface 252. The purpose of the seal band or "bump" 243 is to provide an added measure of sealing engagement between the leg and cone seal ring during operation of the rock bit downhole.

A portion of the resilient material 242 positioned near the leg back face 258 is bonded or secured to a surface 271 of a separate circular lock ring 270. The opposite surface of the lock ring 270 is secured to the journal bearing 232 at the juncture between the journal bearing 232 and the leg back face 258. The lock ring 270 can be secured by an adhesive or preferably is metallurgically bonded or secured to the bearing 232 by a laser weld 280. The leg seal ring 244 comprises a highly polished and pre-lapped first sealing surface 247 made from a first sealing material 246 selected from same hard materials previously described above for a preferred embodiment.

The first sealing surface 247 is urged against a second sealing surface 252 of the cone seal ring 249 by the reaction of the resilient material 242 being compressed against the leg back face 258. The second sealing materials are selected from the same hard materials previously described above for a preferred embodiment. The cone seal ring 249 is positioned within a recessed portion 248 of the cone and is attached to the cone by the same techniques previously described above for attaching the cone seal ring to the cone. It is desired that the surface area of the second sealing surface 252 be larger than the first sealing surface 247 to accommodate possible cone wobble or eccentricities between the rotating cone and its respective journal during rock bit operation. Like a preferred embodiment, the first and second sealing surfaces 247 and 252 can each be made from the same or different material as that forming the leg and cone seal rings 244 and 249, respectively.

It will of course be realized that various other modifications can be made in the design and operation of the present invention without departing from the spirit thereof. Thus, while a preferred construction and mode of operation of the invention have been explained in what is now considered to represent its best embodiments, it should be understood that within the scope of the appended claims, the invention may be practiced otherwise than as specifically illustrated and described.

What is claimed is:

1. A rotary cone rock bit for drilling wells including a mechanical seal between a leg of the rock bit and a rotatable cone mounted on a journal bearing extending from the leg, the seal comprising:

a first seal ring statically sealed to the leg and having a sealing surface selected from the group of hard materials consisting of hard materials consisting of hardened metals, ceramics, and ceramic-metal composites;

a second seal ring statically sealed to the cone and having a sealing surface selected from the group consisting of hard materials consisting of hardened metals, ceramics, and ceramic-metal composites, wherein the sealing surface of the first seal ring and the sealing surface of the second seal ring each have a Knoop hardness greater than about 1000; and means for resiliently biasing the sealing surfaces toward each other for forming a dynamic seal.

2. The rock bit as recited in claim 1 wherein the first seal ring and sealing surface are made from different materials, and the second seal ring and sealing surface are made from different materials.

3. The rock bit as recited in claim 1 wherein each sealing surface has a Knoop hardness in the range of from 1000 and 4000 and has a difference in Knoop hardness of less than approximately 2000.

4. The rock bit as recited in claim 1 wherein each sealing surface has a Knoop hardness less than approximately 2000 and has a difference in Knoop hardness of less than approximately 400.

5. The rock bit as recited in claim 1 wherein the means for resiliently biasing the sealing surfaces toward each other comprises a resilient material partially engaged around a surface of the first seal ring opposite the first sealing surface, the resilient material being compressed against a portion of the leg.

6. The rock bit as recited in claim 1 wherein the sealing surface of the first seal ring comprises a surface area smaller than a sealing surface of the second seal ring.

7. The rock bit as recited in claim 1 wherein the first seal ring and sealing surface are made from the same material, and the second seal ring and sealing surfaces are made from the same material.

8. The rock bit as recited in claim 1 wherein the first and second seal ring sealing surfaces are selected from the group of hard materials consisting of cemented tungsten carbide with 15 percent cobalt, cemented tungsten carbide with 11 percent cobalt, cemented tungsten carbide with 6 percent cobalt, tungsten with 20 percent chromium/7 percent nickel/6 percent carbide, boronized steel, sintered silicon carbide, aluminum oxide, silicon nitride, and diamond.

9. The rock bit as recited in claim 8 wherein the first and second seal ring sealing surfaces are selected from the group of material pairs consisting of tungsten carbide with 15 percent cobalt and tungsten carbide with 11 percent cobalt, tungsten carbide with 11 percent cobalt and tungsten carbide with 6 percent cobalt, tungsten with 20 percent chromium/7 percent nickel/6 percent carbide and tungsten carbide with 15 percent cobalt, tungsten with 20 percent chromium/7 percent nickel/6 percent carbide and tungsten carbide with 11 percent cobalt, tungsten carbide with 6 percent cobalt and aluminum oxide, boronized steel and tungsten with 20 percent chromium/7 percent nickel/6 percent carbide, boronized steel and tungsten carbide with 15 percent cobalt, boronized steel and tungsten carbide with 11 percent cobalt, boronized steel and silicon carbide, aluminum oxide and silicon nitride, aluminum oxide and silicon carbide, silicon nitride and silicon carbide, silicon carbide and silicon carbide, and diamond and diamond.

10. A rotary cone rock bit comprising:
a mechanical seal positioned in a seal cavity formed between a leg of the rock bit and a rotatable cone mounted on a journal bearing extending from the leg of the bit, the mechanical seal comprising:
a leg seal ring having a diameter fitting within the seal cavity, the leg seal ring comprising one surface at least partially engaged by a resilient material positioned adjacent to a face portion of the leg forming a ramp, and an opposite surface comprising a first sealing surface made from a hard material having a Knoop hardness in the range of from about 1000 to 4000; and
a cone seal ring having a diameter fitting within the seal cavity, the cone seal ring comprising one surface positioned adjacent to a recessed portion of the cone, and an opposite surface comprising a second sealing surface made from a hard material different than that of the first sealing surface and having a Knoop hardness in the range of from 1000 to 4000, wherein the second sealing surface is positioned adjacent to the first sealing surface to effect a sealing engagement, and wherein the first and second sealing surfaces are pre-lapped prior to insertion of the leg seal ring into the seal cavity of the rotary cone rock bit for forming a seal between sealing surfaces.

11. The rock bit as recited in claim 10 wherein the materials used to form the first and second sealing surfaces are selected from the group of hardened materials consisting of hardened metals, ceramics, and ceramic-metal composites.

12. The rock bit as recited in claim 11 wherein the hardened materials forming the first and second sealing surfaces are selected from the group of materials consisting of cemented tungsten carbide with 15 percent cobalt, cemented tungsten carbide with 11 percent cobalt, cemented tungsten carbide with 6 percent cobalt, tungsten with 20 percent chromium/7 percent nickel/6 percent carbide, boronized steel, sintered silicon carbide, aluminum oxide, silicon nitride, and diamond.

13. The rock bit as recited in claim 12 wherein the first sealing surface is made from the same material forming the leg seal ring, and the second sealing surface is made from the same material forming the cone seal ring.

14. The rock bit as recited in claim 12 wherein the first sealing surface is made from a material different than a material forming the leg seal ring, and the second seal ring is made from a material different than a material forming the cone seal ring.

15. The rock bit as recited in claim 12 wherein the first sealing surface and the second sealing surface are formed from a first and second sealing material pair, respectively, selected from the group of material pairs consisting of tungsten carbide with 15 percent cobalt and tungsten carbide with 11 percent cobalt, tungsten carbide with 11 percent cobalt and tungsten carbide with 6 percent cobalt, tungsten with 20 percent chromium/7 percent nickel/6 percent carbide and tungsten carbide with 15 percent cobalt, tungsten with 20 percent chromium/7 percent nickel/6 percent carbide and tungsten carbide with 11 percent cobalt, tungsten carbide with 6 percent cobalt and aluminum oxide, boronized steel and tungsten with 20 percent chromium/7 percent nickel/6 percent carbide, boronized steel and tungsten carbide with 15 percent cobalt, boronized steel and tungsten carbide with 11 percent cobalt, boronized steel and silicon carbide, aluminum oxide and silicon nitride, aluminum oxide and silicon carbide, silicon nitride and silicon carbide, silicon carbide and silicon carbide, and diamond and diamond.

16. The rock bit as recited in claim 15 wherein each material selected to form the first and second sealing surfaces has a difference in Knoop hardness of less than approximately 2000, the least hard material being the first sealing surface.

17. The rock bit as recited in claim 16 wherein each sealing surface has a Knoop hardness less than approximately 2000 and has a difference in Knoop hardness of less than approximately 400.

18. The rock bit as recited in claim 16 wherein each material selected to form the first and second sealing surfaces each has a Knoop hardness of greater than 2000.

19. A rotary cone rock bit comprising:

a seal cavity formed between a leg of the rock bit and a rotatable cone mounted on a journal bearing extending from the leg of the bit;

a mechanical seal positioned within the seal cavity between the journal bearing and the cone, the mechanical seal comprising:

a leg seal ring having a diameter adapted to fit within a recessed portion of the leg forming the seal cavity, the leg seal ring comprising a first sealing surface of a material selected from the group of materials consisting of hardened metals, ceramics, and ceramic-metal composites, the material having a Knoop hardness in the range of from about 1000 to 4000;

a cone seal ring having a diameter adapted to fit within a recessed portion of the cone forming the seal cavity, the cone seal ring comprising one surface attached within a recessed portion of the cone and an opposite surface having a second sealing surface positioned adjacent to the first sealing surface, the second sealing surface of a material selected from the group of materials consisting of hardened metals, ceramics, and ceramic-metal composites, the leg and cone seal rings each .having sealing surfaces of different materials having a Knoop hardness in the range of from about 1000 to 4000, wherein the first and second sealing surface has a difference in Knoop hardness of less than 2000; and a resilient material at least partially engaging a surface of the leg seal ring opposite to the first sealing surface, the resilient material is positioned against a face portion of the leg for urging the first sealing surface against the second sealing surface to maintain the first and second sealing surfaces in sealing engagement.

20. The rock bit as recited in claim 19 wherein the leg and cone seal rings are a different hard material selected from the group consisting of cemented tungsten carbide with 11 percent cobalt, cemented tungsten carbide with 6 percent cobalt, sintered silicon carbide, and boronized steel.

21. The rock bit as recited in claim 20 wherein the cone and seal rings are formed from material pairs selected from the group of material pairs obtained by combining one material with a different material, the material forming the first sealing surface having a Knoop hardness smaller than the material forming the second sealing surface.

22. A rotary cone rock bit comprising:

a seal cavity formed between a leg of the rock bit and a rotatable cone mounted on a journal bearing extending from the leg of the bit; and a mechanical seal positioned within the seal cavity between the journal bearing and the cone, the mechanical seal comprising:

a leg seal ring having a diameter adapted to fit within a recessed portion of the leg forming the seal cavity, the leg seal ring comprising a first sealing surface of a material different than the leg seal ring selected from the group of materials consisting of hardened metals, ceramics, and ceramic-metal composites;

a cone seal ring having a diameter adapted to fit within a recessed portion of the cone forming the seal cavity, the cone seal ring comprising one surface attached within a recessed portion of the cone and an opposite surface supporting a second sealing surface positioned adjacent to the first sealing surface, the second sealing surface is formed from a material different than the cone seal ring selected from the group of materials consisting of hardened metals, ceramics, and ceramic-metal composites, the first and second sealing surface each being made from a different material having a Knoop hardness in the range of from about 1000 to 4000, wherein the first and second sealing surface has a difference in Knoop hardness of less than 2000; and a resilient material at least partially engaging a surface of the leg seal ring opposite the first sealing surface, the resilient material being positioned against a face portion of the leg for urging the first sealing surface against the second sealing surface to maintain the first and second sealing surfaces in sealing engagement.

23. The rock bit as recited in claim 22 wherein the first and second sealing surfaces are each made from a hard material selected from the group consisting of cemented tungsten carbide with 15 percent cobalt, cemented tungsten carbide with 11 percent cobalt, cemented tungsten carbide with 6 percent cobalt, tungsten with 20 percent chromium/7 percent nickel/6 percent carbide, sintered silicon carbide, boronized steel, aluminum oxide, silicon nitride, and diamond.

24. The rock bit as recited in claim 23 wherein the first and second sealing surface are formed from materials selected from the group of material pairs obtained by combining one material with a different material, the material forming the first sealing surface having a Knoop hardness less than the Knoop hardness of the material forming the second sealing surface.

* * * * *